(12) United States Patent
Hu et al.

(10) Patent No.: US 11,975,953 B2
(45) Date of Patent: May 7, 2024

(54) LIFTING COLUMN WITH LOW RETRACTED HEIGHT

(71) Applicant: ZHEJIANG JIECANG LINEAR MOTION TECHNOLOGY CO., LTD., Zhejiang (CN)

(72) Inventors: Renchang Hu, Zhejiang (CN); Xiaojian Lu, Zhejiang (CN); Jian Pan, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 161 days.

(21) Appl. No.: 17/761,204

(22) PCT Filed: Dec. 1, 2020

(86) PCT No.: PCT/CN2020/133177
§ 371 (c)(1),
(2) Date: Mar. 17, 2022

(87) PCT Pub. No.: WO2021/110002
PCT Pub. Date: Jun. 10, 2021

(65) Prior Publication Data
US 2022/0348444 A1    Nov. 3, 2022

(30) Foreign Application Priority Data
Dec. 3, 2019 (CN) .......................... 201911218992.4

(51) Int. Cl.
*B66F 3/10* (2006.01)
*E04H 12/18* (2006.01)
(Continued)

(52) U.S. Cl.
CPC ............. *B66F 3/10* (2013.01); *E04H 12/182* (2013.01); *B66F 3/44* (2013.01); *F16H 25/20* (2013.01);
(Continued)

(58) Field of Classification Search
CPC ...... B66F 3/10; B66F 3/18; B66F 3/44; E04H 12/182; F16H 25/2056; F16H 2025/209
(Continued)

(56) References Cited

U.S. PATENT DOCUMENTS

2003/0183027 A1* 10/2003 Koch ...................... F16H 25/20
74/89.35
2011/0225903 A1* 9/2011 Lounis ................... F16M 11/18
248/188.5
(Continued)

FOREIGN PATENT DOCUMENTS

| CN | 206142727 | 5/2017 |
| CN | 208457140 | 2/2019 |

(Continued)

OTHER PUBLICATIONS

Electric Telescopic Joint Lever; CN 115342179 A; Liu, Qiang (Year: 2022).*
(Continued)

*Primary Examiner* — Mahdi H Nejad
(74) *Attorney, Agent, or Firm* — JCIPRNET

(57) ABSTRACT

A lifting column includes a drive unit, a lifting tube, and a transmission assembly. The lifting tube includes a first tube, a second tube, a third tube, a fourth tube, and a fifth tube. The transmission assembly includes a first screw rod, a second screw rod, a third screw rod, and a fourth screw rod. The drive unit is in transmission fit with the first screw rod and drives the first screw rod to rotate. A lower end of the second screw rod has a first nut in transmission with the first (Continued)

screw rod, a lower end of the third screw rod has a second nut in transmission with the second screw rod, a lower end of the fourth screw rod has a third nut in transmission with the third screw rod, and a lower end of the first tube has a fourth nut in transmission with the fourth screw rod.

8 Claims, 8 Drawing Sheets

(51) Int. Cl.
*B66F 3/44* (2006.01)
*F16H 25/20* (2006.01)

(52) U.S. Cl.
CPC .... *F16H 25/2056* (2013.01); *F16H 2025/209* (2013.01)

(58) Field of Classification Search
USPC .......................................................... 254/102
See application file for complete search history.

(56) References Cited

U.S. PATENT DOCUMENTS

| | | | |
|---|---|---|---|
| 2015/0330486 A1* | 11/2015 | Hu | F16H 57/0006 74/89.14 |
| 2016/0047446 A1* | 2/2016 | Hung | A47B 9/04 74/89.35 |
| 2018/0172062 A1* | 6/2018 | Hu | F16H 25/2056 |
| 2019/0360567 A1* | 11/2019 | Hu | F16H 25/20 |
| 2021/0115691 A1* | 4/2021 | Williamson | E04H 12/182 |
| 2021/0370888 A1* | 12/2021 | Peacemaker | B66F 3/10 |
| 2022/0090732 A1* | 3/2022 | Chen | F16B 7/14 |

FOREIGN PATENT DOCUMENTS

| | | | |
|---|---|---|---|
| CN | 109812556 | | 5/2019 |
| CN | 209621790 | | 11/2019 |
| CN | 110980572 | | 4/2020 |
| CN | 211712510 | | 10/2020 |
| JP | H03191184 | * | 8/1991 |
| JP | H03191184 A | * | 8/1991 |
| KR | 20130001749 | | 1/2013 |

OTHER PUBLICATIONS

Ball Screw Pair And Cooling System; CN 217301480 U; Huang, Nan; Zhang, Hui-liang; Long, Feng-qi (Year: 2022).*
A Lifting Mechanism With Long Service Life; CN 105645301 A; Lu, Xiao-jian; Hu, Ren-chang; Wu, Di-zeng; Huang, Zhan-hui (Year: 2016).*
A Lifting Table; Document ID: CN 108078157 B; Date Published: Sep. 4, 2020; Inventor Name: LV, Li-xin; Date Filed: Dec. 18, 2017 (Year: 2020).*
A Jack Structure; Document ID: CN 104773668 A; Date Published: Jul. 15, 2015; Inventor: Xu, Xue-feng; Lu, Tao; Date Filed: Apr. 23, 2015 (Year: 2015).*
A Multiple-screw Mandrel Machine Elevating Lever; Document ID: CN 104961066 A; Date Published: Oct. 7, 2015; Inventor: Zhu, Xi-cheng (Year: 2015).*
Electrically Driven Telescopic Elevation System; Patent No. 20130001749; Document ID: KR 20130001749 A; Date Published: Jan. 7, 2013; Inventor Name: Kim Jin Mok; Date Filed: Jun. 6, 2011 (Year: 2013).*
"International Search Report (Form PCT/ISA/210) of PCT/CN2020/133177," dated Feb. 25, 2021, with English translation thereof, pp. 1-6.
"Office Action of Europe Counterpart Application", issued on Jan. 29, 2024, p. 1-p. 9.

* cited by examiner

LIFTING COLUMN WITH LOW RETRACTED HEIGHT

CROSS-REFERENCE TO RELATED APPLICATION

This application is a 371 of international application of PCT application serial no. PCT/CN2020/133177, filed on Dec. 1, 2020 which claims the priority benefit of China application no. 201911218992.4, filed on Dec. 3, 2019. The entirety of each of the above mentioned patent applications is hereby incorporated by reference herein and made a part of this specification.

TECHNICAL FIELD

Embodiments of the present disclosure relate to lifting columns, and more particularly relate to a lifting column with low retracted height.

DESCRIPTION OF RELATED ART

Lifting columns have properties such as height adjustability and convenient handling, which boost their extensive applications in daily life. Retracted height of a lifting column literally refers to height of the lifting column when being retracted. Conventional lifting columns available in the market generally have a two-section or three-section lifting tube. To satisfy a longer stroke length, conventional lifting columns are generally engineered with a higher retracted height, a consequence of which is that even when being retracted, such lifting columns still have a relatively high retracted height, causing inconvenience to handle.

SUMMARY

Embodiments of the present disclosure provide a lifting column with low retracted height.

A technical solution of the present disclosure provides a lifting column with low retracted height including a drive unit, a lifting tube, and a transmission assembly disposed in the lifting tube. The lifting tube comprises a first tube, a second tube, a third tube, a fourth tube, and a fifth tube, which are sequentially nested from inside to outside. A lower end of the fifth tube is secured on the drive unit. The transmission assembly comprises a first screw rod, a hollow second screw rod, a hollow third screw rod, and a hollow fourth screw rod, which are nested sequentially from inside to outside, and an output end of the drive unit is in transmission fit with the first screw rod and configurable to drive the first screw rod to rotate. A lower end of the second screw rod is provided with a first nut in threaded transmission connection with the first screw rod, a lower end of the third screw rod is provided with a second nut in threaded transmission connection with the second screw rod, a lower end of the fourth screw rod is provided with a third nut in threaded transmission connection with the third screw rod, and a lower end of the first tube is provided with a fourth nut in threaded transmission connection with the fourth screw rod.

Furthermore, an upper end of the first screw rod is provided with a first guide sleeve that limits an axial position of the first nut, an upper end of the second screw rod is provided with a second guide sleeve that limits an axial position of the second nut, an upper end of the third screw rod is provided with a third guide sleeve that limits an axial position of the third nut, and an upper end of the fourth screw rod is provided with a fourth guide sleeve that limits an axial position of the fourth nut.

Furthermore, an outer wall of the first guide sleeve is fitted with an inner wall of the second screw rod, an outer wall of the second guide sleeve is fitted with an inner wall of the third screw rod, an outer wall of the third guide sleeve is fitted with an inner wall of the fourth screw rod, and an outer wall of the fourth guide sleeve is fitted with an inner wall of the first tube.

Furthermore, a positioning groove is provided in a circumferential direction of the fourth screw rod, and the fourth guide sleeve is rotatably disposed in the positioning groove.

Furthermore, the fourth guide sleeve has an opening, and the opening is configured to facilitate pressing the fourth guide sleeve radially into the positioning groove.

Furthermore, the first guide sleeve is securely connected to the first screw rod via a bolt, the second guide sleeve is securely connected to the second screw rod via a bolt, and the third guide sleeve is securely connected to the third screw rod via a bolt.

Furthermore, an oil groove is provided on an inner wall of each of the second screw rod, the third screw rod, and the fourth screw rod, and the oil groove is arranged axially along the respective screw rod.

Furthermore, a lower end of the first screw rod is sleeved with a self-locking device. The self-locking device comprises a torsion spring seat and a torsion spring sleeved over the torsion spring seat.

Furthermore, the fourth nut is securely riveted with the first tube.

Furthermore, all tubes of the lifting tube are square tubes.

The technical solution described above offers the following advantages:

1. The lifting tube comprises a first tube, a second tube, a third tube, a fourth tube, and a fifth tube, which are nested sequentially from inside to outside. The five-section lifting column enables reduction of the retracted height of each section of the lifting tube, thereby achieving a low retracted height of the whole lifting column. The first screw rod, the second screw rod, the third screw rod, and the fourth screw rod are in threaded transmission connection with the first tube, respectively. Since the adjacent screw rods are in threaded transmission connection and respective nut is provided between every two adjacent screw rods, additional means for fixing the nuts is eliminated, which implements a transmission assembly that is compact in both axial and radial directions and further reduces retracted height of the lifting column, thereby providing the lifting column with a low retracted height and a large stroke length.

2. By arranging the first guide sleeve, the second guide sleeve, the third guide sleeve, and the fourth guide sleeve to limit the axial positions of the first nut, the second nut, the third nut, and the fourth nut, respectively, axial moving distance of each nut is restricted, i.e., the axial position of each crew rod is restricted.

3. The outer wall of the first guide sleeve is fitted with the inner wall of the second screw rod, which achieves smoothing transmission when the first guide sleeve is moving in the second screw rod, thereby resulting in smooth lifting and lowering of the whole lifting column. Likewise, the second guide sleeve is fitted with the inner wall of the third screw rod, the third guide sleeve is fitted with the inner wall of the fourth screw rod, and the fourth guide sleeve is fitted with the inner wall of the first tube, which renders smoothing transmission during the entire lifting and lowering process.

4. A positioning groove is disposed in the circumferential direction of the fourth screw rod, and the fourth guide sleeve is rotatably disposed in the positioning groove, in this way, the fourth guide sleeve and the fourth screw rod are non-movable at axial positions but rotatable freely in the circumferential direction, thereby enabling relative rotation between the fourth screw rod and the first tube.

5. The fourth guide sleeve is provided with an opening, and the fourth guide sleeve is radially pressed into the positioning groove via the opening, which facilitates mounting of the fourth guide sleeve.

6. The first guide sleeve and the first screw rod are securely connected via a bolt, the second guide sleeve and the second screw rod are securely connected via a bolt, and the third guide sleeve and the third screw rod are securely connected via a bolt. Such configuration facilitates assembling and disassembling of the first guide sleeve, the second guide sleeve, and the third guide sleeve. Meanwhile, due to self-locking property of bolt threads, a reliable connection is achieved.

7. An oil groove is provided on respective inner wall of each of the second screw rod, the third screw rod, and the fourth screw rod. The oil groove is arranged axially along the respective screw rod, which facilitates machining of the second screw rod, the third screw rod, and the fourth screw rod. Meanwhile, the oil groove may store grease, which further reduces the friction between the first guide sleeve and the second screw rod, the friction between the second guide sleeve and the third screw rod, and the friction between the third guide sleeve and the fourth screw rod.

8. A torsion spring seat and a torsion spring are provided. Since the torsion spring seat restricts axial position of the torsion spring, when the transmission assembly is stressed to have a retraction tendency, the torsion spring limits rotation of the first screw rod, thereby playing a role of self-locking, which renders a more reliable service of the transmission assembly.

9. The fourth nut is securely riveted to the first tube, such that the fourth nut cannot rotate circumferentially. Besides, the riveting process is simple and offers a reliable connection.

BRIEF DESCRIPTION OF THE DRAWINGS

Hereinafter, the present disclosure will be described in further detail with reference to the accompanying drawings, among which.

DESCRIPTION OF THE EMBODIMENTS

Figure 1:
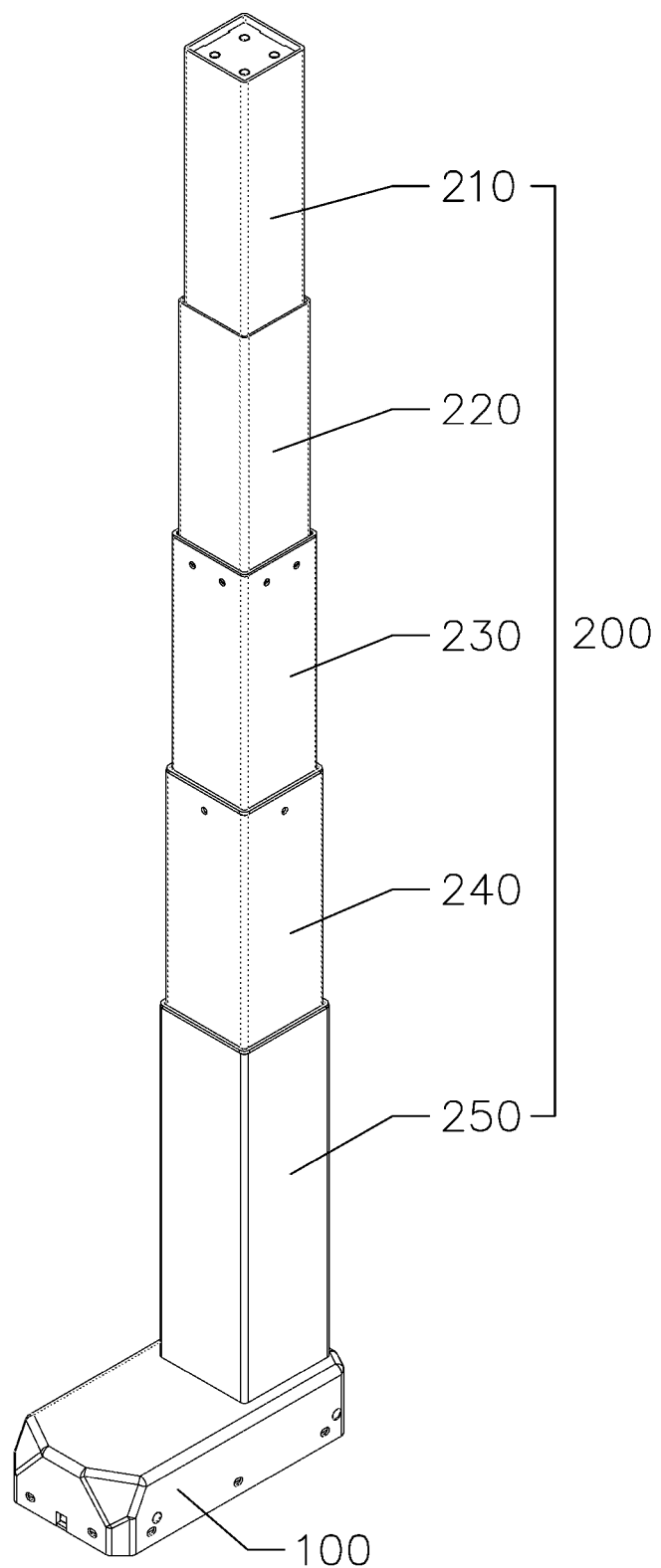
FIG. 1 is a structural schematic diagram of a lifting column according to a first embodiment of the present disclosure.
Figure 2:
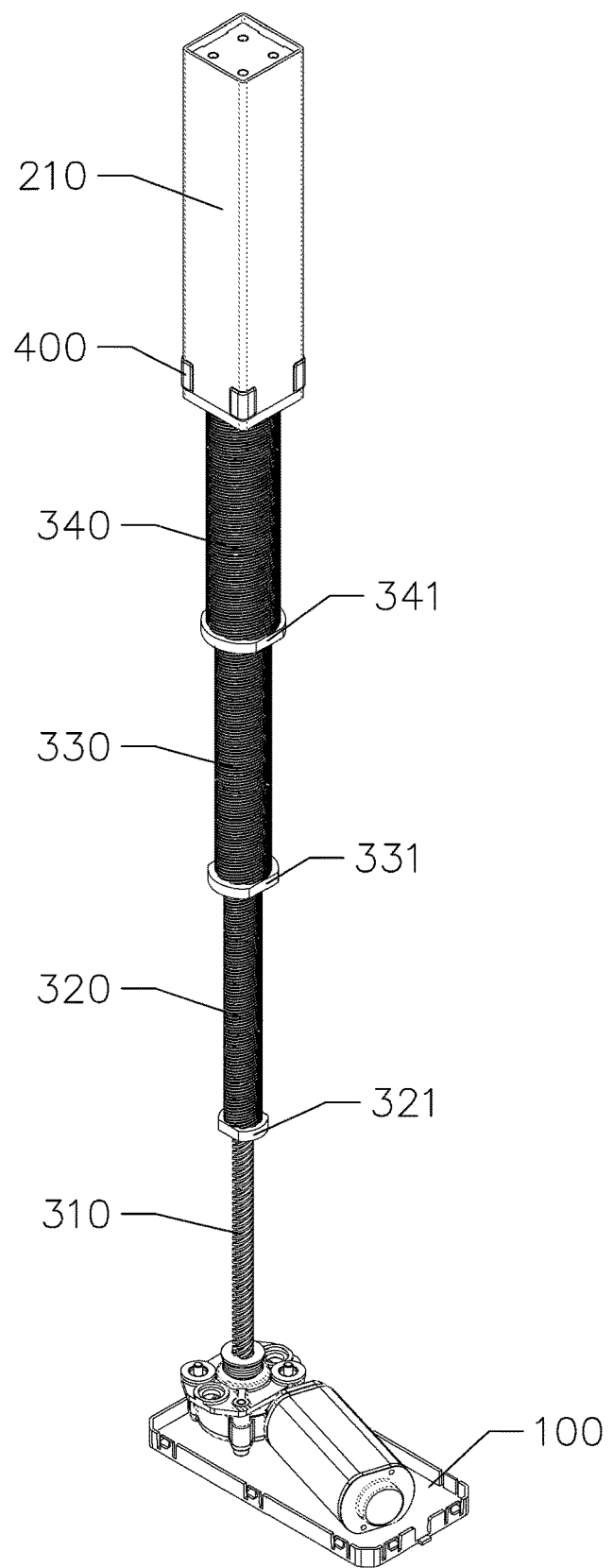
FIG. 2 is a partial structural schematic diagram of the lifting column in the first embodiment of the present disclosure.
Figure 3:
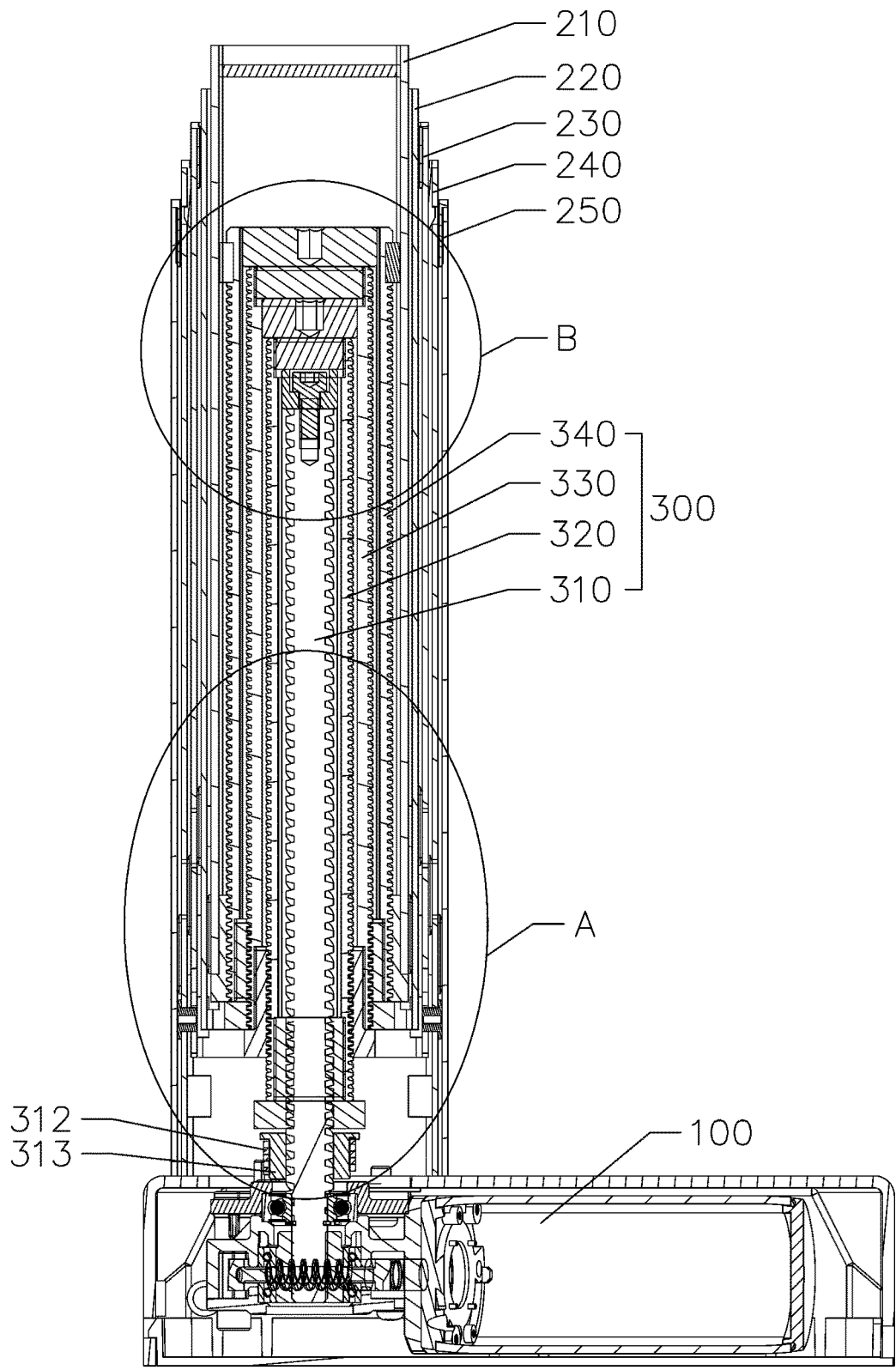
FIG. 3 is a sectional view of the lifting column in the first embodiment of the present disclosure.
Figure 4:
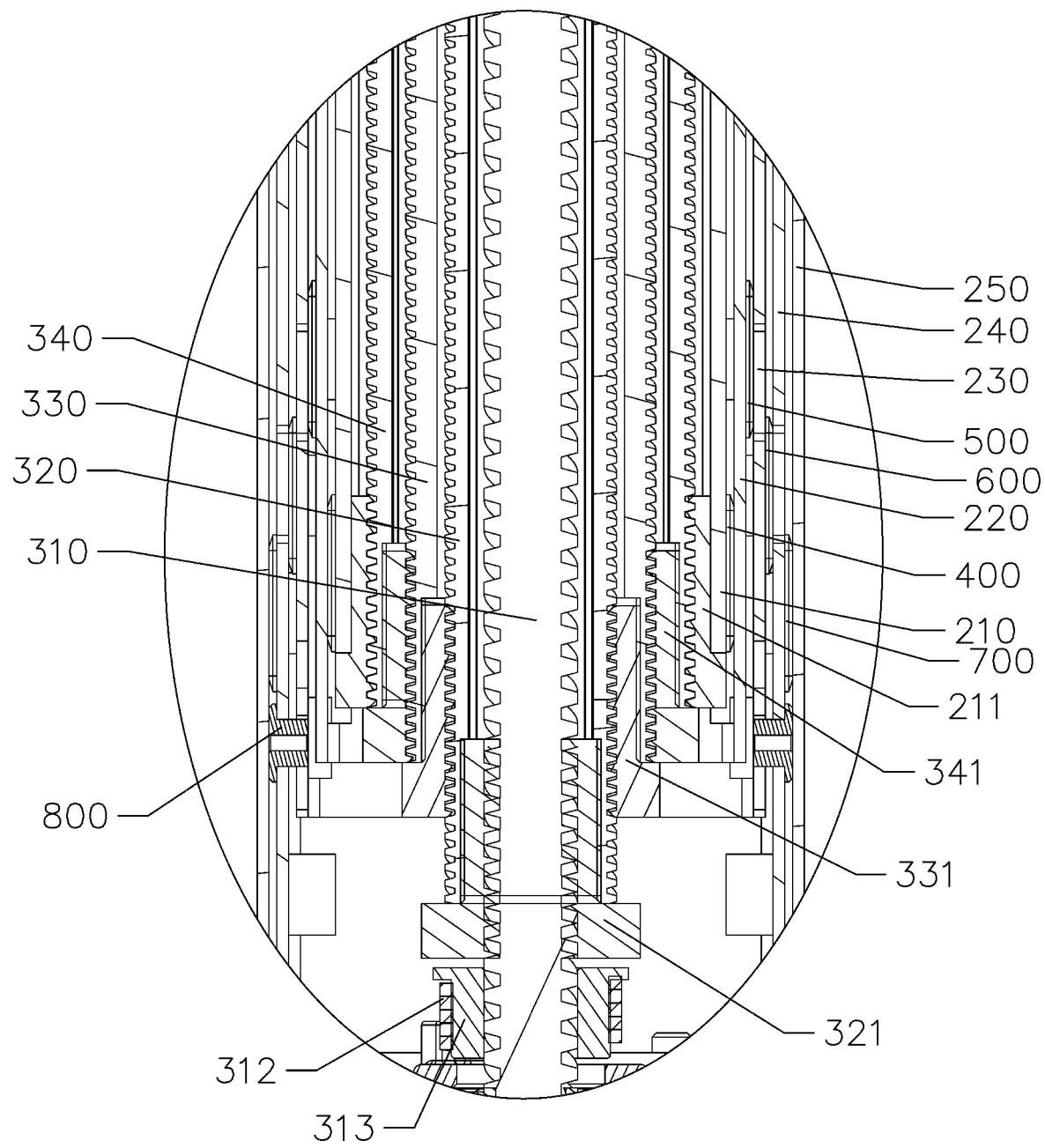
FIG. 4 is an enlarged view of part A in FIG. 3.

Hereinafter, the present disclosure will be described in further detail through embodiments with reference to the accompanying drawings. It needs to be understood that the orientational or positional relationships indicated by the terms "upper," "lower," "left," "right," "longitudinal," "transverse", "inner," "outer," "vertical," "horizontal," "top," "bottom," and etc. are orientational and positional relationships based on the drawings, which are intended only for facilitating description of the present disclosure and simplifying the illustrations, not for indicating or implying that such devices or elements have to possess those specific orientations or have to be configured and operated with those specific orientations; therefore, such terms should not be construed as limitations to the present disclosure.

First Embodiment

As illustrated in FIG. 1 to FIG. 4, a lifting column with low retracted height is provided. The lifting column includes a drive unit 100, a lifting tube 200, and a transmission assembly 300 disposed in the lifting tube 200. The lifting tube 200 comprises a first tube 210, a second tube 220, a third tube 230, a fourth tube 240, and a fifth tube 250, which are sequentially nested from inside to outside. The five-section lifting column enables reduction of the retracted height of each section of the lifting tube, thereby achieving a low retracted height of the whole lifting column. A lower end of the fifth tube 250 is secured on the drive unit 100. The drive unit is disposed at the lower end of the lifting column, and an upper end of the first tube 210 is secured on a lifted platform. It is noted that in this embodiment, the lifting column is bottom-mounted. The transmission assembly 300 comprises a first screw rod 310, a hollow second screw rod 320, a hollow third screw rod 330, and a hollow fourth screw rod 340, which are nested sequentially from inside to outside. An output end of the drive unit 100 is in transmission fit with the first screw rod 310 and configurable to drive the first screw rod 310 to rotate, a lower end of the second screw rod 320 is provided with a first nut 321 that is in threaded transmission connection with the first screw rod 310, a lower end of the third screw rod 330 is provided with a second nut 331 that is in threaded transmission connection with the second screw rod 320, a lower end of the fourth screw rod 340 is provided with a third nut 341 that is in threaded transmission connection with the third screw rod 330, and a lower end of the first tube 210 is provided with a fourth nut 211 that is in threaded transmission connection with the fourth screw rod 340. The first screw rod, the second screw rod, the third screw rod, and the fourth screw rod are in threaded transmission connection with the first tube, respectively. Since the adjacent screw rods are in threaded transmission connection and respective nut is provided between every two adjacent screw rods, additional means for fixing the nuts are eliminated, which implements a transmission assembly that is compact in both axial and radial directions and further reduces retracted height of the lifting column, thereby providing the lifting column with a low retracted height and a large stroke length.

Figure 5:
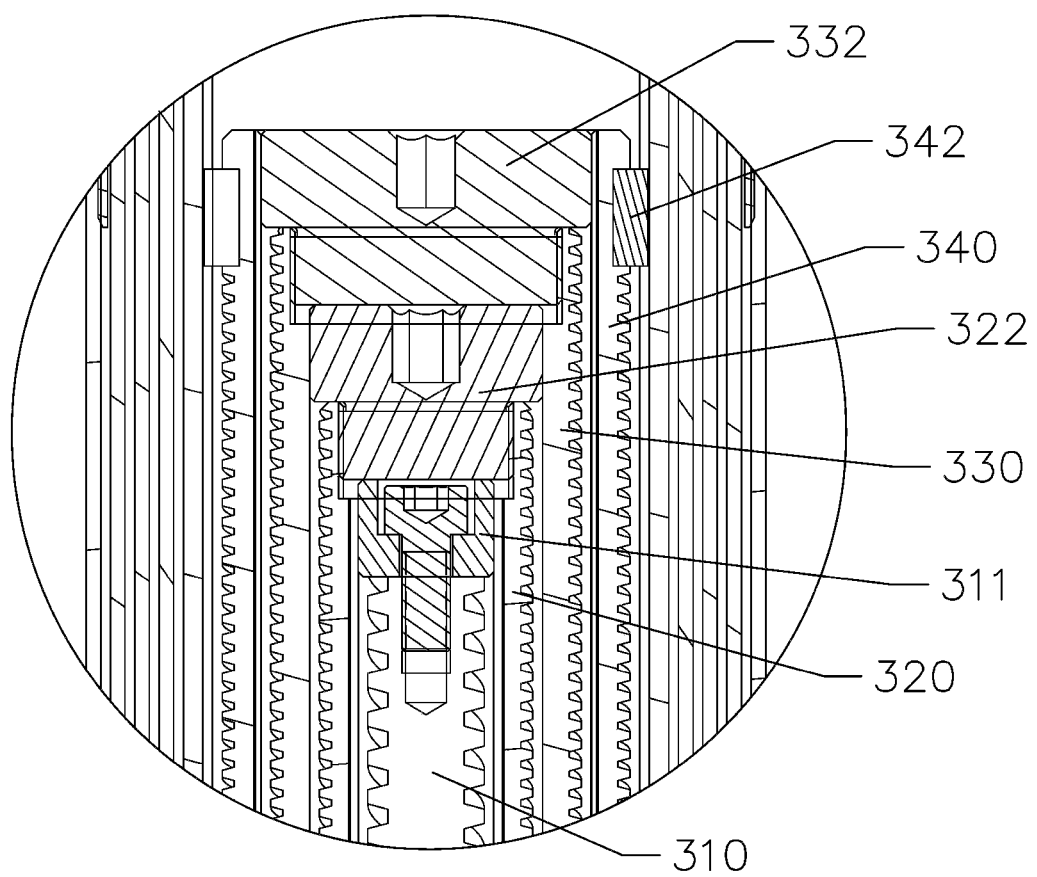
FIG. 5 is an enlarged view of part B in FIG. 3.
Figure 6:
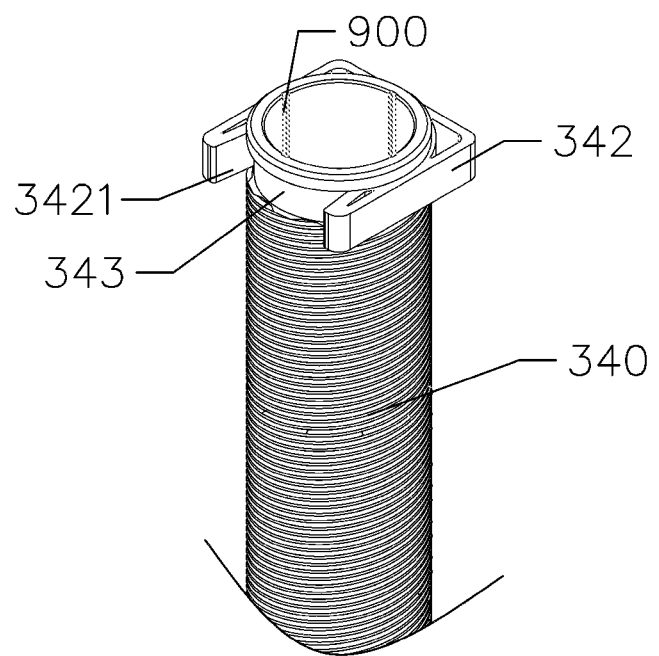
FIG. 6 is a schematic diagram of fitting between a fourth screw rod and a fourth guide sleeve in the lifting column in the first embodiment of the present disclosure.

As illustrated in FIG. 5, in this embodiment, an upper end of the first screw rod 310 is provided with a first guide sleeve 311 that limits axial position of the first nut 321. The first guide sleeve 311 and the first screw rod 310 are securely connected via a bolt. An upper end of the second screw rod 320 is provided with a second guide sleeve 322 that limits the axial position of the second nut 331, and the second guide sleeve 322 and the second screw rod 320 are securely connected via a bolt. An upper end of the third screw rod 330 is provided with a third guide sleeve 332 that limits the axial position of the third nut 341, and the third guide sleeve 332 and the third screw rod 330 are securely connected via a bolt. An upper end of the fourth screw rod 340 is provided with a fourth guide sleeve 342 that limits the axial position of the fourth nut 211. In conjunction with FIG. 6, a positioning groove 343 is provided in the circumferential direction of the fourth screw rod 340, and the fourth guide sleeve 342 is provided with an opening 3421. The fourth guide sleeve 342 is radially pressed into the positioning groove 343 via the opening 3421; in this way, the fourth guide sleeve 342 and the fourth screw rod 340 are non-movable at their axial positions but rotatable freely in the circumferential direction, which further results in that the fourth screw rod 340 and the first tube 210 may rotate relative to each other.

An outer wall of the first guide sleeve 311 is fitted with an inner wall of the second screw rod 320, which achieves smoothing transmission when the first guide sleeve 311 is moving in the second screw rod 320. An outer wall of the second guide sleeve 322 is fitted with an inner wall of the third screw rod 330, which achieves smoothing transmission when the second guide sleeve 322 is moving in the third screw rod 330. An outer wall of the third guide sleeve 332 is fitted with an inner wall of the fourth screw rod 340, which achieves smoothing transmission when the third guide sleeve 332 is moving in the fourth screw rod 340. Since the first tube 210, the second tube 220, the third tube 230, the fourth tube 240 and the fifth tube 250 of the lifting tube 200 are all square tubes, rotation between adjacent tubes may be restricted. An outer wall of the fourth guide sleeve 342 is fitted with an inner wall of the first tube 210. Since the fourth guide sleeve 342 is a square guide sleeve, smoothing transmission is achieved when the fourth guide sleeve 342 is moving in the first tube 210, which further achieves smoothing transmission during the entire lifting and lowering process.

A lifting process of the lifting column is described as follows. An output end of the drive unit 100 actuates the first screw rod 310 to rotate. Since the fourth nut 211 is non-rotatable due to being fixed on the first tube 210 while the first nut 321 has the largest thread helix angle, the first nut 321 moves upward along the first screw rod 310 and brings the remaining screw rods to move upward as a whole, at this time, the first guide sleeve 311 rotates and translates in the second screw rod 320, which ensures smoothing movement of the remaining screw rods. When the first nut 321 accesses the first guide sleeve 311, the first screw rod 310 suspends axial movement and the second screw rod 320 rotates with the first screw rod 310, at this time, since the helix angle of the second nut 331 is greater than that of the third nut 341 and that of the fourth nut 211, the second nut 331 starts moving upward along the second screw rod 320, and at this time, the second guide sleeve 322 rotates and translates in the third screw rod 330, which ensures smoothing movement of the entire lifting column. When the second nut 331 accesses the second guide sleeve 322, the second screw rod 320 suspends axial movement, and the third screw rod 330 rotates with the first screw rod 310 and the second screw rod 320, at this time, since the helix angle of the third nut 341 is greater than that of the fourth nut 211, the third nut 341 starts moving upward along the third screw rod 330, and at this time, the third guide sleeve 332 rotates and translates in the fourth screw rod 340, which ensures smoothing movement of the entire lifting column. When the third nut 341 accesses the third guide sleeve 332, the third screw rod 330 suspends axial movement, and the fourth screw rod 340 rotates with the first screw rod 310, the second screw rod 320, and the third screw rod 330, at this time, the fourth nut 211 moves upward along the fourth screw rod 340, and the fourth guide sleeve 342 translates in the first tube 210, which ensures smoothing movement of the lifting column. When the fourth nut 211 accesses the fourth guide sleeve 342, the stroke length of the transmission assembly reaches the maximum, and when the second screw rod 320, the third screw rod 330, the fourth screw rod 340, and the first tube 210 are moving upward, the second tube 220, the third tube 230, the fourth tube 240, and the fifth tube 250 are brought to move upward, thereby realizing lifting of the lifting column.

Following the same principle, to lower the lifting column, the first screw rod 310 rotates, the first nut 321 first moves downward along the first screw rod 310, and then sequentially, the second nut 331 moves downward along the second screw rod 320, the third nut 341 moves downward along the third screw rod 330, and the fourth nut 211 moves downward along the fourth screw rod 340. When the second screw rod 320, the third screw rod 330, the fourth screw rod 340, and the first tube 210 are moving downward, the second tube 220, the third tube 230, the fourth tube 240, and the fifth tube 250 are brought to move downward, thereby realizing lowering of the lifting column.

A first slider 400 is provided between the first tube 210 and the second tube 220. The first slider 400 is fixed at the lower end of the first tube 210. A second slider 500 is provided between the second tube 220 and the third tube 230. The second slider 500 is fixed at the lower end of the second tube 220. A third slider 600 is provided between the third tube 230 and the fourth tube 240, and the third slider 600 is fixed at the lower end of the third tube 230. A fourth slider 700 is provided between the fourth tube 240 and the fifth tube 250, and the fourth slider 700 is fixed at the lower end of the fourth tube 240. A stationary block is provided at respective upper end of each inner wall of each of the second tube 220, the third tube 230, the fourth tube 240, and the fifth tube 250, such that an upper limit of the second tube 220 is implemented by contact between the second slider 500 and the stationary sliders on the inner wall of the third tube 230, an upper limit of the third tube 230 is implemented by contact between the third slider 600 and the stationary sliders on the inner wall of the fourth tube 240, and an upper limit of the fourth tube 240 is implemented by contact between the fourth slider 700 and the stationary sliders on the inner wall of the fifth tube 250.

A lower slider 800 is provided at a lower end of the inner wall of the fifth tube 250, such that a lower limit of the second tube 220 and a lower limit of the third tube 230 are respectively implemented by contact of the second tube 220 and contact of the third tube 230 with the lower slider 800.

An oil groove 900 is provided on an inner wall of each of the second screw rod 320, the third screw rod 330, and the fourth screw rod 340. The oil groove 900 is arranged axially along each screw rod. Arrangement of the oil grooves facilitates machining of the second screw rod, the third screw rod, and the fourth screw rod; meanwhile, the oil grooves may store grease to further reduce the friction between the first guide sleeve and the second screw rod, the friction between the second guide sleeve and the third screw rod, and the friction between the third guide sleeve and the fourth screw rod.

A self-locking device is provided to sleeve a lower end of the first screw rod 310. The self-locking device comprises a torsion spring seat 313 and a torsion spring 312 sleeved over the torsion spring seat 313. The torsion spring seat 313 limits the axial position of the torsion spring 312, such that when the transmission assembly 300 is stressed to have a retraction tendency, the torsion spring 312 limits rotation of the first screw rod 310, which plays a role of self-locking, thereby rendering more reliable service of the transmission assembly.

The fourth nut 211 is securely riveted to the first tube 210, such that the fourth nut cannot rotate circumferentially; besides, the riveting process is simple and offers a reliable connection.

Second Embodiment

This embodiment differs from the first embodiment mainly in that the lifting column is top-mounted.

Figure 7:
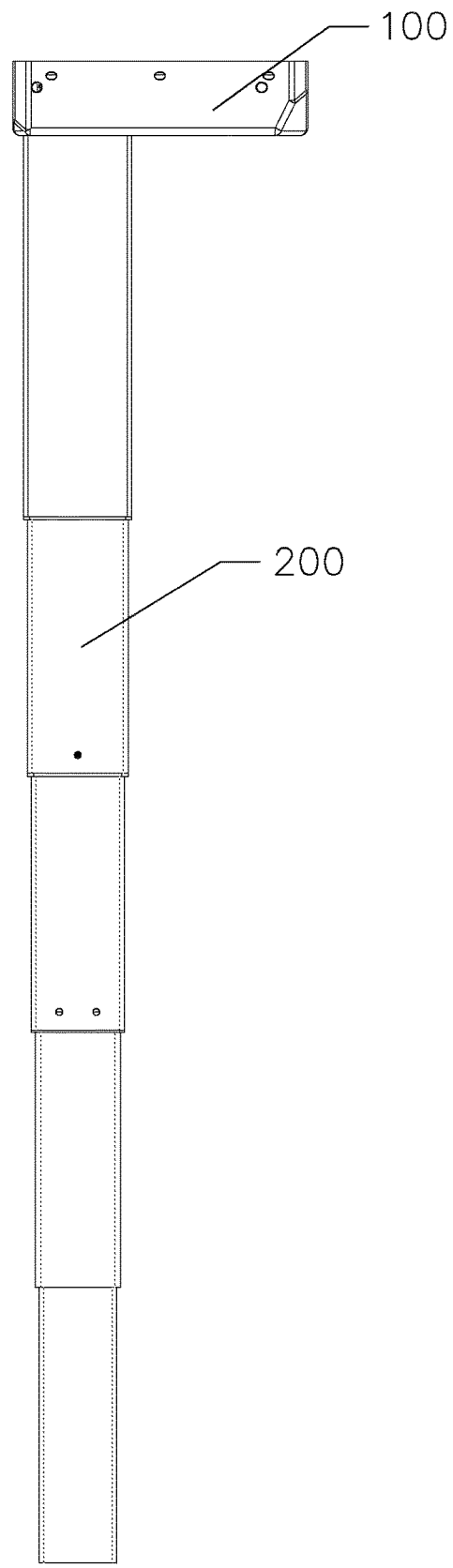
FIG. 7 is a structural schematic diagram of a lifting column according to a second embodiment of the present disclosure.
Figure 8:
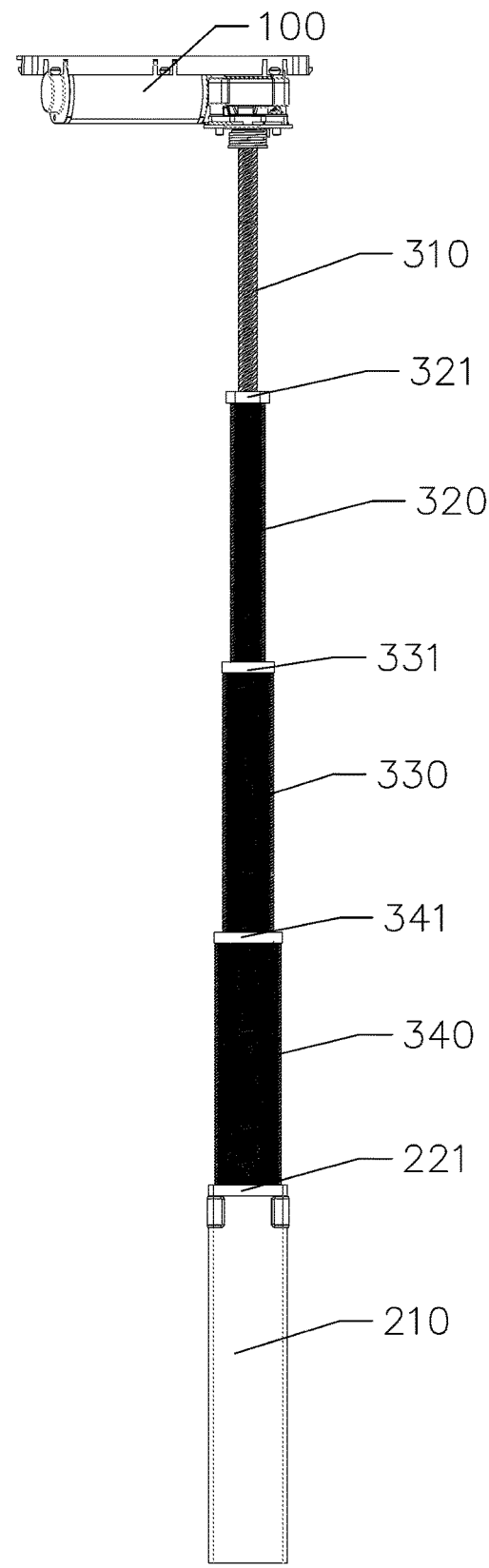
FIG. 8 is a partial structural schematic diagram of the lifting column in the second embodiment of the present disclosure.

As illustrated in FIG. 7 and FIG. 8, for a top-mounted lifting column, the drive unit 100 is secured to a lifted platform. The lifting tube 200 is disposed at the lower end of the drive unit 100, the first nut 321 is disposed at an upper end of the second screw rod 320, the second nut 331 is disposed at an upper end of the third screw rod 330, the third nut 341 is disposed at an upper end of the fourth screw rod 340, and the fourth nut 221 is disposed at an upper end of the first tube 210.

In addition to the embodiments described above, the present disclosure further has other embodiments. Those skilled in the art may make various variations and alternations based on the present disclosure, and such variations and alterations should fall within the scope defined by the appended claims without departing from the spirit of the present disclosure.

What is claimed is:

1. A lifting column with low retracted height, the lifting column comprising: a drive unit, a lifting tube, and a transmission assembly disposed in the lifting tube, wherein the lifting tube comprises a first tube, a second tube, a third tube, a fourth tube, and a fifth tube, which are sequentially nested from inside to outside, a lower end of the fifth tube is secured on the drive unit; the transmission assembly comprises a first screw rod, a hollow second screw rod, a hollow third screw rod, and a hollow fourth screw rod, which are nested sequentially from inside to outside, an output end of the drive unit is in transmission fit with the first screw rod and configurable to drive the first screw rod to rotate; and a lower end of the second screw rod is provided with a first nut in threaded transmission connection with the first screw rod, a lower end of the third screw rod is provided with a second nut in threaded transmission connection with the second screw rod, a lower end of the fourth screw rod is provided with a third nut in threaded transmission connection with the third screw rod, and a lower end of the first tube is provided with a fourth nut in threaded transmission connection with the fourth screw rod, an upper end of the first screw rod is provided with a first guide sleeve that limits an axial position of the first nut, an upper end of the second screw rod is provided with a second guide sleeve that limits an axial position of the second nut, an upper end of the third screw rod is provided with a third guide sleeve that limits an axial position of the third nut, and an upper end of the fourth screw rod is provided with a fourth guide sleeve that limits an axial position of the fourth nut, an outer wall of the first guide sleeve is fitted with an inner wall of the second screw rod, an outer wall of the second guide sleeve is fitted with an inner wall of the third screw rod, an outer wall of the third guide sleeve is fitted with an inner wall of the fourth screw rod, and an outer wall of the fourth guide sleeve is fitted with an inner wall of the first tube.

2. The lifting column with low retracted height according to claim 1, wherein a positioning groove is provided in a circumferential direction of the fourth screw rod, and the fourth guide sleeve is rotatably disposed in the positioning groove.

3. The lifting column with low retracted height according to claim 2, wherein the fourth guide sleeve has an opening, and the fourth guide sleeve is pressed radially into the positioning groove through the opening.

4. The lifting column with low retracted height according to claim 1, wherein the first guide sleeve is securely connected to the first screw rod via a bolt, the second guide sleeve is securely connected to the second screw rod via a bolt, and the third guide sleeve is securely connected to the third screw rod via a bolt.

5. The lifting column with low retracted height according to claim 1, wherein an oil groove is provided on an inner wall of each of the second screw rod, the third screw rod, and the fourth screw rod, and the oil groove is arranged axially along the first screw rod, the second screw rod, the third screw rod, and the fourth screw rod.

6. The lifting column with low retracted height according to claim 1, wherein a lower end of the first screw rod is sleeved with a self-locking device, wherein the self-locking device comprises a torsion spring seat and a torsion spring sleeved over the torsion spring seat.

7. The lifting column with low retracted height according to claim 1, wherein the fourth nut is securely riveted with the first tube.

8. The lifting column with low retracted height according to claim 1, wherein the first tube, the second tube, the third tube, the fourth tube, and the fifth tube of the lifting tube are square tubes.

* * * * *